(12) United States Patent
Krten

(10) Patent No.: US 10,867,032 B2
(45) Date of Patent: Dec. 15, 2020

(54) GENERATING AND EXECUTING PROTECTED ITEMS OF SOFTWARE

(71) Applicant: IRDETO B.V., LS Hoofddorp (NL)

(72) Inventor: Robert Krten, LS Hoofddorp (NL)

(73) Assignee: IRDETO B.V., Hoofddorp (NL)

(*) Notice: Subject to any disclaimer, the term of this patent is extended or adjusted under 35 U.S.C. 154(b) by 679 days.

(21) Appl. No.: 15/511,761

(22) PCT Filed: Sep. 17, 2014

(86) PCT No.: PCT/EP2014/069806
§ 371 (c)(1),
(2) Date: Jul. 10, 2017

(87) PCT Pub. No.: WO2016/041592
PCT Pub. Date: Mar. 24, 2016

(65) Prior Publication Data
US 2019/0354679 A1    Nov. 21, 2019

(51) Int. Cl.
*G06F 21/54*    (2013.01)
*G06F 21/57*    (2013.01)

(52) U.S. Cl.
CPC .............. *G06F 21/54* (2013.01); *G06F 21/57* (2013.01); *G06F 2221/2123* (2013.01)

(58) Field of Classification Search
CPC ... G06F 21/54; G06F 21/57; G06F 2221/2123
See application file for complete search history.

(56) References Cited

U.S. PATENT DOCUMENTS 7,987,451 B1 * 7/2011 Dalcher .............. G06F 11/3612
                                                         717/126
9,465,936 B2 * 10/2016 Tosa ...................... G06F 21/556
(Continued)

FOREIGN PATENT DOCUMENTS

CN    101278260 A    10/2008
CN    102047261 A    5/2011
(Continued)

OTHER PUBLICATIONS

Schuster, F. et al., "Evaluating the Effectiveness of Current Anti-ROP Defenses," Technical Report TR-HGI-2014-001, May 5, 2014, accessed at :http:jjwww.hgi.ruhr-uni-bochum.dejmediajemmajveroef-fentlichungen/2014/05/09/TR-HGI-2014-001 1 1.pdf, pp. 22.
(Continued)

*Primary Examiner* — Christopher A Revak
(74) *Attorney, Agent, or Firm* — Rimon PC; Marc Kaufman

(57) ABSTRACT

A method of generating a protected item of software, there being an execution path within code for the protected item of software that causes code for one or more second functions to be executed before executing code for a first function, wherein execution of the code for the one or more second functions causes data to be stored at one or more memory locations, the data satisfying a set of one or more predetermined properties, wherein, in the absence of an attack against the protected item of software when the code for the protected item of software is being executed, the first function is arranged to provide first functionality, the method comprising: configuring the code for the first function so that execution, by one or more processors, of the code for the first function provides the first functionality only if the set of one or more predetermined properties is satisfied by data being stored, when the first function is executed, at the one or more memory locations.

16 Claims, 6 Drawing Sheets

(56) References Cited

U.S. PATENT DOCUMENTS

| | | | | |
|---|---|---|---|---|
| 9,594,912 | B1* | 3/2017 | Thioux | G06F 21/577 |
| 9,684,511 | B2* | 6/2017 | Shanbhogue | G06F 9/30054 |
| 9,703,948 | B2* | 7/2017 | Caprioli | G06F 9/30145 |
| 9,946,875 | B2* | 4/2018 | Fischer | G06F 21/552 |
| 10,055,585 | B2* | 8/2018 | Dalcher | G06F 21/566 |
| 10,114,643 | B2* | 10/2018 | Yamada | G06F 21/54 |
| 2009/0144309 | A1* | 6/2009 | Cabrera Escandell | G06F 21/54 |
| 2011/0145921 | A1* | 6/2011 | Mathur | G06F 21/52 726/23 |
| 2013/0036464 | A1* | 2/2013 | Glew | G06F 21/52 726/22 |
| 2013/0117843 | A1* | 5/2013 | Komaromy | G06F 21/52 726/22 |
| 2016/0026581 | A1* | 1/2016 | Muttik | G06F 12/1441 726/26 |

FOREIGN PATENT DOCUMENTS

| | | | | |
|---|---|---|---|---|
| EP | 3 195 177 | A1 | 7/2017 | |
| WO | WO 2014/189510 | A1 * | 11/2014 | G06F 21/50 |
| WO | 2016/041592 | A1 | 3/2016 | |

OTHER PUBLICATIONS

Richarte, G., "Four different tricks to bypass StackShield and StackGuard protection 4 Notes on random canary 23 5 Solutions? 24 6 Conclusions 24 7 Gracias—Thanks 25," Core Security Technologies, Apr. 9, 2002-Apr. 24, 2002, accessed at http://www.coresecurity.com/filesjattachments/StackGuard.pdf, pp. 26.

Fratric, I., "Runtime Prevention of Return-Oriented Programming Attacks," accessed at https://ropguard.googlecode.comjsvn-history/r2/trunk/docjropguard.pdf, pp. 10.

Kanazaki, Y. et al., "Exploiting self-modification mechanism for program protection," Proceedings of the 27th Annual International Computer Software and Applications Conference, Nov. 3, 2003, pp. 170-178.

International Search Report and Written Opinion dated Jul. 28, 2015 for International Patent Application No. PCT/EP2014/069806.

Lucas Davi et al: "Stitching the Gadgets: On the Ineffectiveness of Coarse-Grained Control-Flow Integrity Protection"; 23rd USENIX Security Symposium; Aug. 22, 2014, pp. 1-17.

Nahmsuk Oh et al: "Control-Flow Checking by Software Signatures"; IEEE Transactions on Reliability; IEEE Service Center, Piscataway, NJ, US; vol. 51, No. 1; Mar. 2002; ISSN: 0018-9529.

Communication pursuant to Rule 161 and 162 EPC received in corresponding European Application No. 14771548.6, dated May 12, 2017, 2 pages.

Communication pursuant to Article 94(3) EPC received in corresponding European Application No. 14771548.6, dated Jul. 17, 2018, 5 pages.

International Preliminary report on patentability issued in corresponding PCT Application No. PCT/EP2014/069806, dated Mar. 30, 2017, 13 pages.

National Intellectual Property Administration, P.R. China, Office Action for Chinese Application No. 201480083471.1, dated Oct. 9, 2019.

National Intellectual Property Administration, P.R. China, Office Action for Chinese Application No. 201480083471.1, dated Jul. 3, 2020.

* cited by examiner

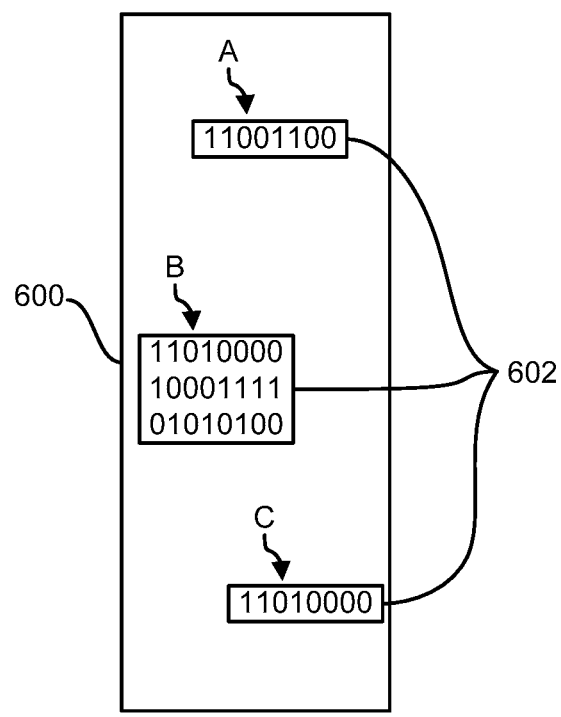
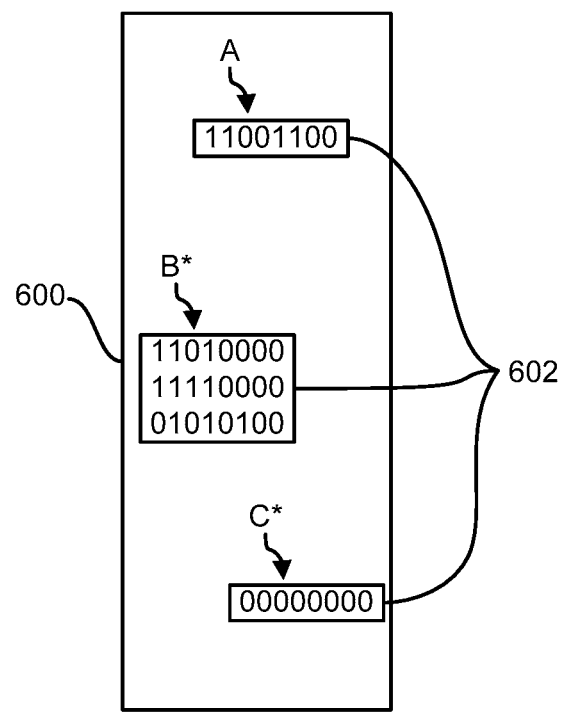
Data being stored D={A,B,C}
Data being stored D={A,B*,C*}
FIGURE 6a
FIGURE 6b

GENERATING AND EXECUTING PROTECTED ITEMS OF SOFTWARE

FIELD OF THE INVENTION

The present invention relates to methods of generating a protected item of software, methods of executing items of software, protected items of software, and computer programs and apparatus for carrying out such methods.

BACKGROUND OF THE INVENTION

It is known for attackers to launch attacks against software applications. Such attacks can have very wide reaching and damaging consequences (in terms of financial loss, reputation loss, time loss, data loss and data leakage). Software and system developers are in a permanent struggle with the attackers, whereby the developers try to develop measures to thwart attacks that attackers might launch, and with the attackers trying to develop new attacks that overcome or bypass the measures taken by the developers.

One example attack type is the so-called "return oriented programming" (ROP) attack. With a ROP attack, an attacker obtains an item of software (namely the item of software against which the attacker wishes to perform an attack) and performs a static analysis on the code (or instructions, such as machine language instructions or opcodes of compiled software and/or data) of the item of software. In particular, the attacker looks for a machine language instruction (or opcode) in the item of software that causes (or implements) a function return or a procedure return (such as the OxC3 instruction for the x86 architecture). Having found such a "return instruction", the attacker identifies one or more of the instructions that immediately precede the return instruction in the item of software. The return instruction, together with one or more of its immediately preceding instructions, together form a so-called "gadget".

For example, the instructions for a particular function fin the item of software may be along the lines of the following pseudocode of Example 1 below:

```
f
{
    ...
    ...
    inc cx
    ret
}
```

Example 1

In this example, the "return instruction" is illustrated as the instruction ret and the instruction inc cx illustrates the one or more identified instructions that immediately precede the return instruction. The attacker may, therefore, have identified or located the instruction ret in the code for the item of software. The attacker may, as part of his attack, wish to execute an inc cx instruction—the attacker therefore identifies the presence of the inc cx instruction immediately preceding the ret instruction as being of use to him (as will become apparent from the discussion below). Therefore, the attacker identifies the instructions inc cx and ret as together forming a gadget available for the attacker to use in an attack. It will, of course, be appreciated that instructions other than inc cx may be of use to an attacker, and that a gadget can comprise more than one instruction that immediately precedes the return instruction.

The attacker identifies a plurality of such gadgets, each potentially with different respective instruction(s) to thereby effectively identify or form a library of identified gadgets within the item of software.

The ROP attack then involves the attacker performing a so-called "stack smashing attack" (e.g. identifying a buffer overflow vulnerability in the item of software which effectively enables the attacker to write to the stack whatever data the attacker wishes place on the stack). This allows the attacker to write one or more return addresses on the call stack. In this way, the attacker can write a return address that identifies the first instruction in a gadget to thereby cause a processor to execute the instructions in the gadget. Once the instructions in that gadget have been executed, the return instruction at the end of the gadget causes execution to continue at the next return address on the call stack—this return address on the call stack may also be a value that the attacker has managed to write to the call stack and that may be an address that identifies the first instruction in another gadget, meaning that the attacker can cause the processor to execute the instructions in that other gadget. Extending this, the attacker can execute any sequence of gadgets that the attacker wishes. Essentially, the attacker uses existing code within an item of software in unintended ways, by transferring control to the tail-end portions of subroutines (functions or procedures) instead of calling those subroutines via their normal entry-points.

For example, if the attacker wishes to perform an inc cx instruction as part of the attack, then the attacker can include on the call stack the address of the inc cx instruction of the above example gadget.

If the initial item of software is large enough, then the library of gadgets available to, and generated by, the attacker is sufficient that the instruction set the attacker can execute using the gadgets becomes a Turing complete language—thus, the attacker can execute any series of instructions for any functionality he wishes (including loops and conditional branching).

The ROP attack is particularly damaging, because it makes use of the instructions in the item of software itself, so that many countermeasures, such as integrity verification, will not detect the ROP attack—this is because no new instructions per se are being introduced/written by the attacker.

Given the nature of ROP attacks, it is possible for an attacker to automate the identification of gadgets and the creation of the gadget library that the attacker can exploit. Following this, the attacker's desired functionality can be easily prepared into an attack (e.g. as a series of return addresses to load onto the stack via a buffer overflow).

Other attacks exist that make use of the original instructions that exist in the initial item of software. Additionally, attackers are constantly developing new attacks and evolving existing attacks. Given that one of the resources available to an attacker is the set of instructions that form the item of software itself, it is highly likely that ROP-related attacks (or other completely different attacks) that make use of the instructions that form the item of software will be developed and deployed by attackers.

SUMMARY OF THE INVENTION

It would be desirable to provide developers of items of software with countermeasures and defences against such attacks. It is an object of some embodiments of the invention to provide one or more countermeasures and defences against such attacks. Similarly, it would be desirable to make it more difficult for an attacker to automate the successful generation of attacks—if the generation of an attack cannot be automated, then the attacker needs to manually intervene in the attack generation, which slows down the attack generation or, indeed, may cause the attacker to seek a different target item of software to attack. It is an object of some embodiments of the invention to make it harder for attackers to automate their attack generation. It would be desirable to provide developers of items of software with countermeasures and defences against such attacks. It is an object of some embodiments of the invention to provide one or more countermeasures and defences against such attacks. Furthermore, it would be desirable to have the ability to detect and/or thwart such attacks whilst they are occurring, even if the above-mentioned countermeasures and defences were not deployed or were to be ineffective. It is an object of some embodiments of the invention to generate and/or execute protected items of software that have the ability to detect and/or take countermeasures against such attacks whilst they are occurring at run time.

According to a first aspect of the invention, there is provided a method of generating a protected item of software, there being an execution path within code for the protected item of software that causes code for one or more second functions to be executed before executing code for a first function, wherein execution of the code for the one or more second functions causes data to be stored at one or more memory locations, the data satisfying a set of one or more predetermined properties, wherein, in the absence of an attack against the protected item of software when the code for the protected item of software is being executed, the first function is arranged to provide first functionality, the method comprising: configuring the code for the first function so that execution, by one or more processors, of the code for the first function provides the first functionality only if the set of one or more predetermined properties is satisfied by data being stored, when the first function is executed, at the one or more memory locations.

In some embodiments, said configuring is arranged so that execution, by the one or more processors, of the code for the first function provides a second predetermined functionality, different from the first functionality, if the set of one or more predetermined properties is not satisfied by data being stored, when the first function is executed, at the one or more memory locations.

In some embodiments, said configuring comprises including, as part of the code for the first function, a portion of code which, when executed by the one or more processors, causes the one or more processors to: determine whether or not the set of one or more predetermined properties is satisfied by data being stored, when the first function is executed, at the one or more memory locations; and if the set of one or more predetermined properties is determined to not be satisfied, provide a second predetermined functionality, different from the first functionality. The portion of code may be included as part of the code for the first function in proximity to a return point in the code for the first function. Alternatively, the portion of code may be included as part of the code for the first function in proximity to a start of the code for the first function.

In some embodiments, the second predetermined functionality is independent of the data being stored, when the first function is executed, at the one or more memory locations.

In some embodiments, the method comprises receiving an initial item of software, wherein the code for the initial item of software comprises initial code for the first function, wherein said configuring comprises modifying the initial code for the first function to generate the code for the first function for the protected item of software. The code for the initial item of software may comprise initial code for at least one of the one or more second functions, in which case the method may comprise modifying the initial code for the at least one of the one or more second functions to generate the code for at least one of the one or more second functions for the protected item of software.

According to a second aspect of the invention, there is provided a method of executing an item of software, there being an execution path within code for the item of software that causes code for one or more second functions to be executed before executing code for a first function, wherein execution of the code for the one or more second functions causes data to be stored at one or more memory locations, the data satisfying a set of one or more predetermined properties, wherein, in the absence of an attack against the item of software when the code for the item of software is being executed, the first function is arranged to provide first functionality, the method comprising: executing, by one or more processors, the code for the first function, wherein the execution provides the first functionality only if the set of one or more predetermined properties is satisfied by data being stored, when the first function is executed, at the one or more memory locations.

In some embodiments, said executing comprises providing a second predetermined functionality, different from the first functionality, if the set of one or more predetermined properties is not satisfied by data being stored, when the first function is executed, at the one or more memory locations.

In some embodiments, said executing comprises: determining whether or not the set of one or more predetermined properties is satisfied by data being stored, when the first function is executed, at the one or more memory locations; and if the set of one or more predetermined properties is determined to not be satisfied, providing a second predetermined functionality, different from the first functionality. Said determining may be performed by a portion of the code for the first function that is in proximity to a return point in the code for the first function. Alternatively, said determining may be performed by a portion of the code for the first function that is in proximity to a start of the code for the first function.

In some embodiments, the second predetermined functionality is independent of the data being stored, when the first function is executed, at the one or more memory locations.

In some embodiments, the data being stored, when the first function is executed, at the one or more memory locations satisfying the one or more predetermined properties is indicative that the one or more second functions and the first function have been called in a predetermined order. In some embodiments, the data being stored, when the first function is executed, at the one or more memory locations not satisfying the one or more predetermined properties is indicative that the one or more second functions and the first function have not been called in a predetermined order. In either case, the first function may be a function $F_0$ and, together, the one or more second functions and the first function may form a group of functions $F_i$ for $i=0, \ldots, N$, where $N$ is a positive integer, and wherein, for each $i=1, \ldots, N$, the function $F_i$ is arranged to call the function $F_{i-1}$.

In some embodiments, the data stored by execution of the code for the one or more second functions comprises one or more predetermined values.

In some embodiments, the data stored by execution of the code for the one or more second functions comprises one or more values determined, at least in part, by a calculation performed when executing at least one of the one or more second functions.

In some embodiments, the data stored by execution of the code for the one or more second functions comprises an address of an instruction within one of the one or more second functions at which execution is to resume after execution of a function called by the one of the one or more second functions has finished.

In some embodiments, the code for the first function is configured so that, upon finishing execution of the first function, execution of the code for the item of software resumes at an address that is dependent on at least a part of the data stored by execution of the code for the one or more second functions. The execution of the code for the item of software resuming at the address that is dependent on at least a part of the data stored by execution of the code for the one or more second functions may avoid execution of one or more dummy instructions.

In some embodiments, the one or more memory locations comprises at least one location on a stack.

In some embodiments, satisfaction of the set of one or more predetermined properties by data stored at the one or more memory locations is based, at least in part, on one or more of: (a) at least a part of the data being stored at the one or more memory locations having a predetermined value; (b) two or more items of data being stored at the one or more memory locations having a predetermined relationship; and (c) at least a part of the data being stored at the one or more memory locations enabling determination of an address of an instruction to which execution flow is to continue in order to provide the first functionality.

According to a third aspect of the invention, there is provided an item of software, wherein there is an execution path within code for the item of software that causes code for one or more second functions to be executed before executing code for a first function, wherein execution of the code for the one or more second functions causes data to be stored at one or more memory locations, the data satisfying a set of one or more predetermined properties, wherein, in the absence of an attack against the item of software when the code for the item of software is being executed, the first function is arranged to provide first functionality, wherein the code for the first function is arranged to provide the first functionality only if the set of one or more predetermined properties is satisfied by data being stored, when the first function is executed, at the one or more memory locations.

In some embodiments, the code for the first function is arranged so that a second predetermined functionality, different from the first functionality, is provided if the set of one or more predetermined properties is not satisfied by data being stored, when the first function is executed, at the one or more memory locations.

In some embodiments, the code for the first function is arranged to: determine whether or not the set of one or more predetermined properties is satisfied by data being stored, when the first function is executed, at the one or more memory locations; and if the set of one or more predetermined properties is determined to not be satisfied, provide a second predetermined functionality, different from the first functionality. Said determining may be performed by a portion of the code for the first function that is in proximity to a return point in the code for the first function. Alternatively, said determining may be performed by a portion of the code for the first function that is in proximity to a start of the code for the first function.

In some embodiments, the second predetermined functionality is independent of the data being stored, when the first function is executed, at the one or more memory locations.

In some embodiments, the data being stored, when the first function is executed, at the one or more memory locations satisfying the one or more predetermined properties is indicative that the one or more second functions and the first function have been called in a predetermined order. In some embodiments, the data being stored, when the first function is executed, at the one or more memory locations not satisfying the one or more predetermined properties is indicative that the one or more second functions and the first function have not been called in a predetermined order. In either case, the first function may be a function $F_0$ and, together, the one or more second functions and the first function may form a group of functions $F_i$ for $i=0, \ldots, N$, where $N$ is a positive integer, and wherein, for each $i=1, \ldots, N$, the function $F_i$ is arranged to call the function $F_{i-1}$.

In some embodiments, the data stored by execution of the code for the one or more second functions comprises one or more predetermined values.

In some embodiments, the data stored by execution of the code for the one or more second functions comprises one or more values determined, at least in part, by a calculation performed when executing at least one of the one or more second functions.

In some embodiments, the data stored by execution of the code for the one or more second functions comprises an address of an instruction within one of the one or more second functions at which execution is to resume after execution of a function called by the one of the one or more second functions has finished.

In some embodiments, the code for the first function is configured so that, upon finishing execution of the first function, execution of the code for the item of software resumes at an address that is dependent on at least a part of the data stored by execution of the code for the one or more second functions. The execution of the code for the item of software resuming at the address that is dependent on at least a part of the data stored by execution of the code for the one or more second functions may avoid execution of one or more dummy instructions.

In some embodiments, the one or more memory locations comprises at least one location on a stack.

In some embodiments, satisfaction of the set of one or more predetermined properties by data stored at the one or more memory locations is based, at least in part, on one or more of: (a) at least a part of the data being stored at the one or more memory locations having a predetermined value; (b) two or more items of data being stored at the one or more memory locations having a predetermined relationship; and (c) at least a part of the data being stored at the one or more memory locations enabling determination of an address of an instruction to which execution flow is to continue in order to provide the first functionality.

According to a fourth aspect of the invention, there is provided a method of generating a protected item of software, the method comprising: including, as part of the protected item of software, a first portion of code, wherein at least a part of the first portion of code is useful to an attacker for performing an attack of a predetermined type against the protected item of software; and including, as part of the protected item of software, a second portion of code, wherein the second portion of code enables, at run time of the protected item of software, a modification of at least part of the first portion of code.

In some embodiments, the first portion of code is included as part the protected item of software so that at least a part of the first portion of code is never executed when executing the protected item of software.

In some embodiments, said including, as part of the protected item of software, a first portion of code comprises: identifying, in code for the protected item of software, a third portion of code; modifying the third portion of code to form the first portion of code; and using the first portion of code, instead of the third portion of code, as part of the protected item of software; and wherein said modification of said at least part of the first portion of code at run time of the protected item of software changes the first portion of code to the third portion of code.

In some embodiments, the method comprises including, as part of the protected item of software, a further portion of code, wherein the further portion of code enables, at run time of the protected item of software, undoing of said modification of at least part of the first portion of code.

In some embodiments, the method comprises receiving an initial item of software and modifying the initial item of software so as to generate the protected item of software, wherein said modifying the initial item of software comprises said including, as part of the protected item of software, a first portion of code and said including, as part of the protected item of software, a second portion of code.

According to a fifth aspect of the invention, there is provided a method of executing an item of software, wherein said item of software comprises code, said code comprising a first portion of code that is useful to an attacker for performing an attack of a predetermined type against the item of software, wherein said method comprises: modifying, at run time of the protected item of software, at least part of the first portion of code.

In some embodiments, the first portion of code is never executed when executing the item of software.

In some embodiments, said modification to the at least part of the first portion of code generates a modified first portion of code that is arranged to perform intended functionality for the item of software.

In some embodiments of the fourth or fifth aspect of the invention, the predetermined type is a return oriented programming attack.

In some embodiments of the fourth or fifth aspect of the invention, said modification of at least part of the first portion of code is arranged so that, if an attacker performs an attack of the predetermined attack and said attack is arranged to use the first portion of code, then the presence of the modified first portion of code at run time instead of the first portion of code causes said attack to fail.

According to a sixth aspect of the invention, there is provided an item of software comprising: a first portion of code that is useful to an attacker for performing an attack of a predetermined type against the item of software; and a second portion of code that is arranged to modify, at run time of the protected item of software, at least part of the first portion of code.

In some embodiments, the first portion of code is never executed when executing the item of software.

In some embodiments, said modification to the at least part of the first portion of code generates a modified first portion of code that is arranged to perform intended functionality for the item of software.

In some embodiments, said code comprises a further portion of code, wherein the further portion of code enables, at run time of the item of software, undoing of said modification of at least part of the first portion of code.

In some embodiments, the predetermined type is a return oriented programming attack.

According to a seventh aspect of the invention, there is provided a method of generating a protected item of software, comprising: performing a method according to the first aspect of the invention; and performing a method according to the fourth aspect of the invention. The protections applied via the first aspect of the invention and via the fourth aspect of the invention may be applied in any order so as to generate a protected item of software.

According to an eighth aspect of the invention, there is provided a method of executing an item of software, comprising: performing a method according to the second aspect of the invention; and performing a method according to the fifth aspect of the invention. The methods of the second and fifth aspects may be performed in any order or at the same time.

According to a ninth aspect of the invention, there is provided an apparatus arranged to carry out any one of the above-described methods.

According to a tenth aspect of the invention, there is provided a computer program which, when executed by one or more processors, causes the one or more processors to carry out any one of the above-described methods.

According to an eleventh aspect of the invention, there is provided a computer-readable medium storing a computer program according to the tenth aspect of the invention or storing an item of software according to the third or sixth aspects of the inventions.

BRIEF DESCRIPTION OF THE DRAWINGS

Embodiments of the invention will now be described, by way of example only, with reference to the accompanying drawings, in which:

FIG. 6a schematically illustrates the storage of data by one or more second functions; and FIG. 6b schematically illustrates an example of the effect that an attack might have on the storage of data.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below.

It will be evident, however, that various modifications and changes may be made herein without departing from the broader spirit and scope of the invention as set forth in the appended claims.

1—System Overview

Figure 1:
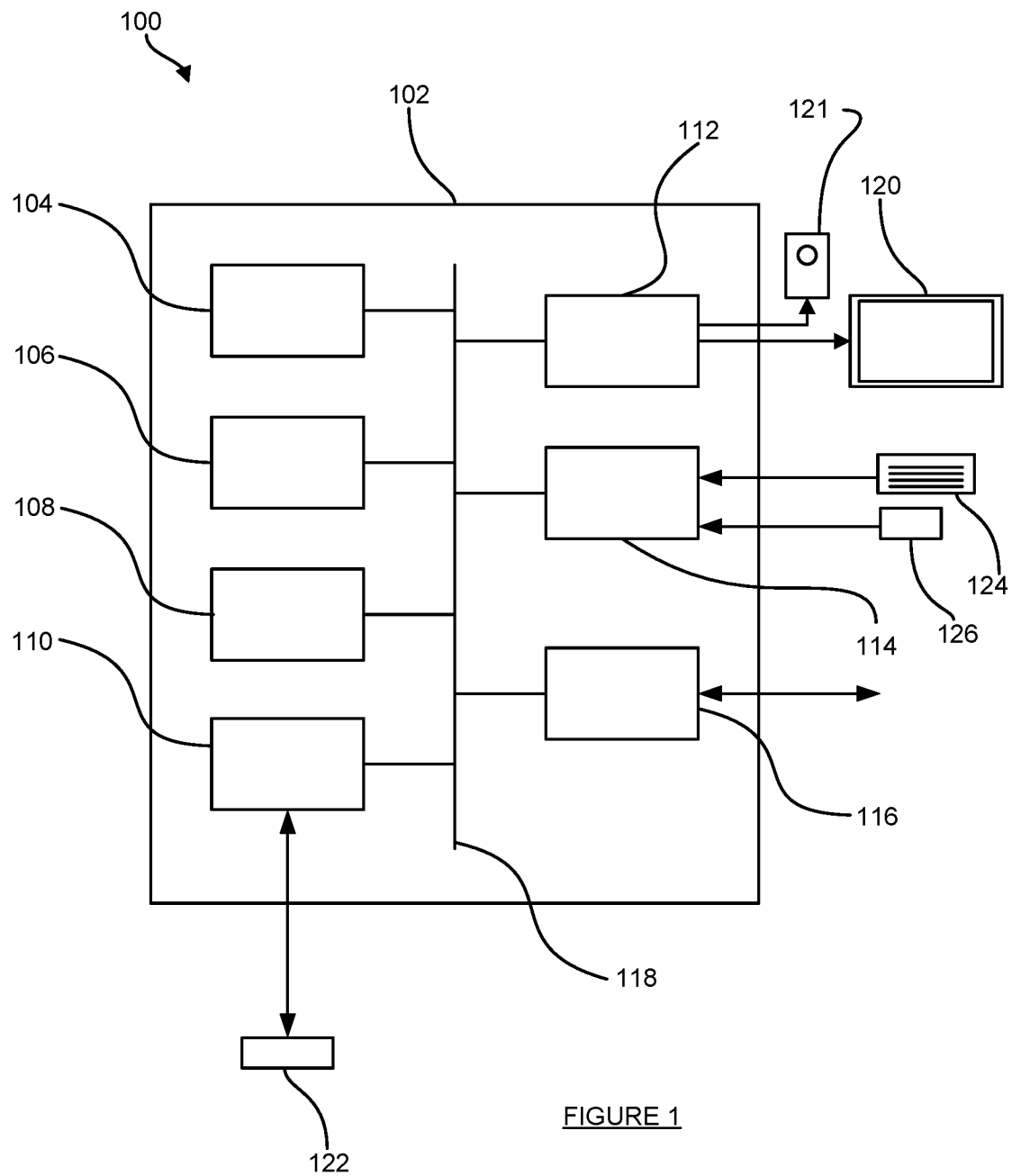
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2:
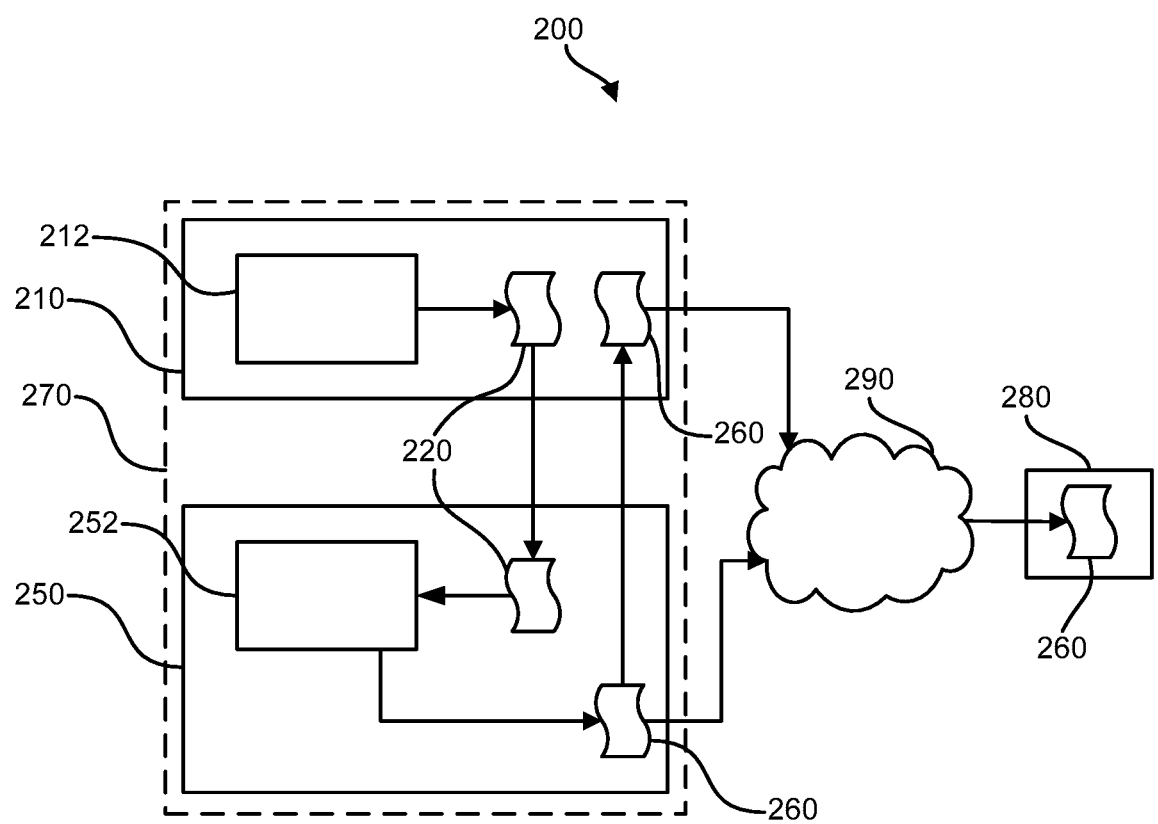
FIG. 2 schematically illustrates a system according to an embodiment of the invention.

FIG. 2 schematically illustrates a system 200 according to an embodiment of the invention. The system 200 comprises: a software generation system 210; a software protection system 250; a user system 280; and a network 290.

The software generation system 210 comprises (or executes or uses) a software generation tool 212 that generates an initial item of software 220. The software generation tool 212 may be, for example, a software application that a processor of the software generation system 210 executes. The software generation system 210 may be arranged to generate the initial item of software 220 autonomously; additionally or alternatively, the software generation system 210 may be arranged to generate the initial item of software 220 under the control of one or more software developers who write, at least in part, software code that forms part of the initial item of software 220. Tools for generating or developing an item of software are very well-known and shall, therefore, not be described in more detail herein.

The initial item of software 220 may comprise one or more of source code, object code, executable code and binary code. The initial item of software 220 may be programmed or written in one or more programming languages, which may comprise compiled programming languages and/or interpreted or scripted programming languages. The initial item of software 220 may comprise one or more modules or software components or computer programs, which may be presented or stored within one or more files. Indeed, the initial item of software 220 may be an entire software application, a software library, or the whole or a part of one or more software functions or procedures, or anywhere in-between (as will be appreciated by the person skilled in the art).

The initial item of software 220, when executed by a processor, may be arranged to perform (or to cause the processor to perform) any kind of desired data processing.

The software protection system 250 comprises (or executes or uses) a software protection tool 252. The software protection tool 252 may be, for example, a software application that a processor of the software protection system 250 executes. The software protection tool 252 is arranged to receive, as an input, the initial item of software 220. The software protection tool 252 generates a protected item of software 260 based on the received initial item of software 220. Methods by which the software protection tool 252 generates the protected item of software 260 shall be described later.

The software generation system 210 and the software protection system 250 may be run or operated by different entities. Thus, as shown in FIG. 2, the software protection system 250 may output the protected item of software 260 to the software generation system 210. With this model, the software protection system 250 provides a protection service to the software generation system 210. Alternatively, the software generation system 210 and the software protection system 250 may be run or operated by the same entity—indeed, the software generation system 210 and the software protection system 250 may form part of a single system (illustrated in FIG. 2 by the dashed line 270) that uses the software generation tool 212 to generate an initial item of software 220 and that uses the software protection tool 252 to protect that initial item of software 220 by generating a protected item of software 260.

Thus, the software generation system 210 and/or the software protection system 250 may output (or provide or communicate) the protected item of software 260 to the user system 280 via the network 290. It will be appreciated, however, that distribution of the protected item of software 260 may be performed by a different entity not shown in FIG. 2.

It will also be appreciated that the protected item of software 260 may undergo various additional processing after the protected item of software 260 has been generated by the software protection system 250 and before distribution to the user system 280. It will, therefore, be appreciated that in this description, references to distribution or use of the protected item of software 260 include distribution or use of the piece of software that results from applying the additional processing to the protected item of software 260. For example, the protected item of software 260 may need to be compiled and/or linked with other items of software (for instance if the protected item of software 260 is to form part of a larger software application that is to be distributed to the user system 280). However, it will be appreciated that such additional processing may not be required.

The network 290 may be any kind of data communication network suitable for communicating or transferring the protected item of software 260 to the user system 280. Thus, the network 290 may comprise one or more of: a local area network, a wide area network, a metropolitan area network, the Internet, a wireless communication network, a wired or cable communication network, a satellite communications network, a telephone network, etc. The software generation system 210 and/or the software protection system 250 may be arranged to communicate with the user system 280 via the network 290 via any suitable data communication protocol. Indeed, the protected item of software 260 may be provided to the user system 280 via a physical medium (such as being stored on one or more CDs or DVDs), so that the network 290 may then comprise a delivery system for physically delivering the physical medium to the user system 280.

The user system 280 is arranged to use the protected item of software 260, for example by executing the protected item of software 260 on one or more processors of the user system 280.

The user system 280 may be any system suitable for executing the protected item of software 260. Thus, the user system 280 may be one or more of: a personal computer, a laptop, a notepad, a tablet computer, a mobile telephone, a set top box, a television, a server, a games console, etc. The software protection system 250 and the software generation system 210 may, for example, comprise one or more personal computers and/or server computers. Thus, each of the user system 280, the software protection system 250 and the software generation system 210 may comprise one or more respective systems 100 as described above with reference to FIG. 1.

It will be appreciated that, whilst FIG. 2 illustrates the system 200 as comprising a single user device 280, a single software generation system 210, and a single software protection system 250, the system 200 may comprise multiple user devices 280 and/or multiple software generation systems 210 and/or multiple software protection systems 250.

Embodiments of the invention are described above in which a software developer (a) uses the software generation system 210 to generate an initial (unprotected) item of software 220 and then (b) uses the software protection system 250 to apply one or more of the protections (or attack countermeasures), such as those to be described shortly, to the initial item of software 220 to thereby generate the protected item of software 260. However, it will be appreciated that, in some embodiments of the invention, the software generation tool 212 of the software generation system 210 may be arranged to apply one or more of these protections (or attack countermeasures) to the initial item of software 220 as the initial item of software 220 is being written/generated. In such embodiments, a separate software protection system 260 is not needed, and the initial item of software 220 is, effectively, the protected item of software 260. Similarly, it will be appreciated that, in some embodiments of the invention, the software developer may write the initial item of software 220, using the software generation tool 212 of the software generation system 210, so that the initial item of software 220 includes, from the outset, one or more of these protections (or attack countermeasures). Again, in such embodiments, a separate software protection system 260 is not needed, and the initial item of software 220 is, effectively, the protected item of software 260.

2—Software Protections/Countermeasures

Figure 3A:
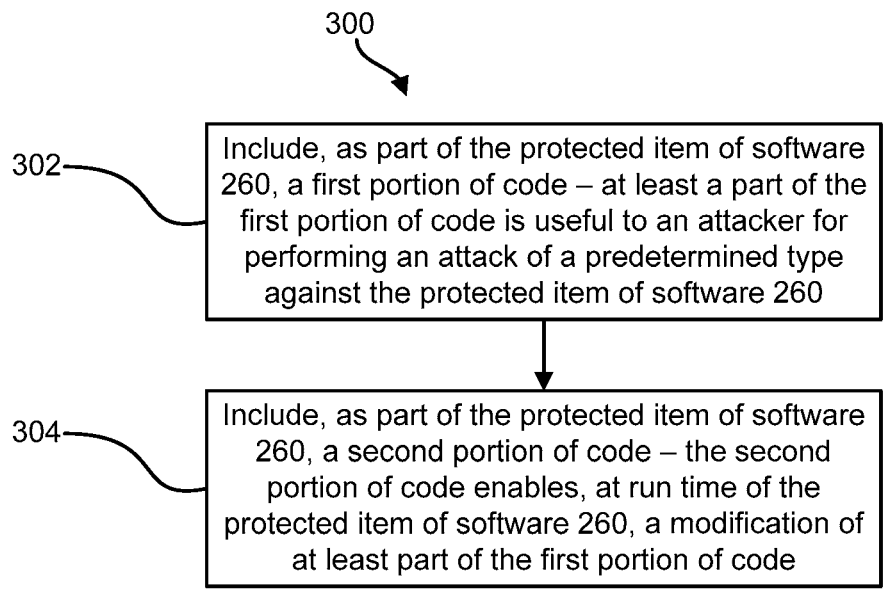
FIGS. 3a and 3b are flow charts that schematically illustrate embodiments of the invention that make use of a first type of software protection (or attack countermeasure)
Figure 3B:
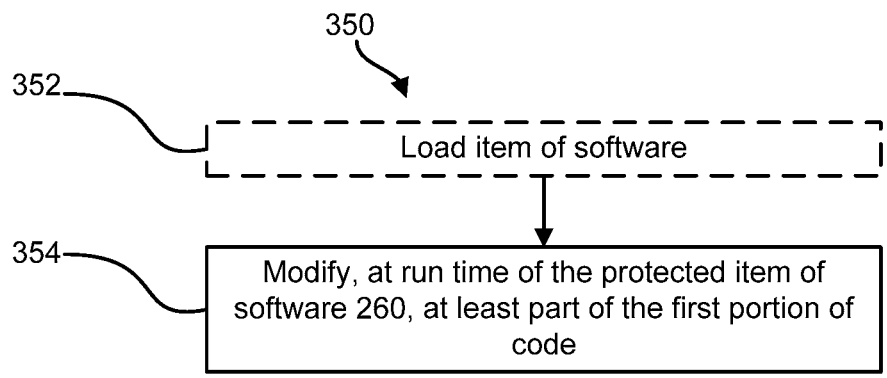

FIGS. 3*a* and 3*b* are flow charts that schematically illustrate embodiments of the invention that make use of a first type of software protection (or attack countermeasure). In particular, FIG. 3*a* is a flow chart illustrating a method 300, according to an embodiment of the invention, performed by the software protection tool 252 to generate a protected item of software 260; whilst FIG. 3*b* is a flow chart illustrating a method 350, according to an embodiment of the invention, performed by the user system 280 when executing the protected item of software 260.

We turn, first, to the method 300 performed by the software protection tool 252 to generate a protected item of software 260. It will be appreciated that the software protection tool 252 may apply one or more other protections or attack countermeasures, in addition to those described below with reference to the method 300, to the initial item of software 220 in order to generate a protected item of software 260.

At a step 302 of the method 300, the software protection tool 252 includes, as part of the protected item of software 260, a first portion of code. At least a part (or possibly all) of this first portion of code is useful to an attacker for performing an attack of a predetermined type against the protected item of software 260.

Here, the first portion of code may comprise one or more instructions (such as machine language instructions or opcodes). In some embodiments, the first portion of code is included as a sequence of consecutive instructions in the protected item of software 260—however, it will be appreciated that this need not necessarily be the case for other embodiments. The first portion of code may, therefore, be viewed as one or more sections or parts or snippets or collections of instructions that the software protection tool 252 includes within, or as part of, the protected item of software 260.

The predetermined type of attack may be, for example, a ROP attack. However, it will be appreciated that the predetermined type of attack may be any other kind (or sort or category) of attack (either currently known or yet to be developed) that an attacker may wish to launch against an item of software. The predetermined type of attack may be, for example, a category of attacks in which the attacker tries to use, as part of an attack against a given item of software, one or more instructions already in (or that form) that given item of software.

As mentioned, at least a part of the first portion of code is useful to an attacker for performing an attack of the predetermined type against the protected item of software 260. Exactly what constitutes "useful" to an attack will depend, at least in part, on the predetermined type of attack. For example, as mentioned above, an attacker who wishes to launch a ROP attack may wish to execute a predetermined sequence of one or more instructions (such as the inc cx instruction in Example 1 above), in which case the first portion of code may comprise that predetermined sequence of one or more instructions followed by a return instruction (such as the gadget made up of the inc cx and ret instructions in Example 1 above).

Instructions in the first portion of code may be considered useful to an attacker for performing an attack of the predetermined type against the protected item of software 260 if a tool (such as a static analysis tool or some other automated tool), usable by an attacker in designing/developing and/or carrying out an attack of the predetermined type, would identify at least a part of the first portion of code as comprising one or more instructions for the attacker to use as part of an attack of the predetermined type.

The first portion of code may be included as part of the protected item of software 260 as completely new instructions (i.e. as instructions in addition to the instructions originally present/existing in the initial item of software 220). Additionally, or alternatively, the first portion of code may be included as part of the protected item of software 260 by modifying one or more of the instructions originally present/existing in the initial item of software 220.

For example, the first portion of code may be included as part of the protected item of software 260 so that at least a part of the first portion of code is never executed when executing the protected item of software 260. This part that is never executed may comprise some or all of the at least a part of the first portion of code that is useful to an attacker for performing an attack of the predetermined type against the protected item of software 260. In this way, the first portion of code may be viewed as a "dummy" portion of code or a "decoy" portion of code. This could be achieved in a number of ways, for example:

(a) Instructions could be included as part of the protected item of software 260, where those instructions represent a function that never gets called during execution of the protected item of software 260, and where the instructions for that function include the first portion of code.

(b) Instructions could be included as part of an existing function of the initial item of software 220, where these new instructions of the first portion of code include an instruction that causes an unconditional jump in the execution flow to thereby avoid executing at least a part of the instructions of the first portion of code. For example, the initial item of software 220 may already comprise code for a function f as show below in the pseudocode of Example 2a:

```
f
{
    ...
    ...
    ret
}
```

Example 2a

The software protection tool 252 may include additional instructions (i.e. the first portion of code) into the function f so that, in the protected item of software 260, the instructions for the function f are as shown below in the pseudocode of Example 2b:

```
f
{
    ...
    ...
    jmp skip_over
    inc cx
skip_over:
    ret
}
```

Example 2b

In this example, the first portion of code comprises the jmp and inc cx instructions. The inc cx instruction forms a part of the first portion of code that the attacker may find useful in performing an attack of the predetermined attack type (since the inc cx instruction, together with the existing ret instruction, may form a gadget that the attacker may wish to use). The instruction represented by jmp causes the processor, when executing the instructions for the function f, to cause execution flow to jump over, or omit, the inc cx instruction.

In some embodiments, the step 302 comprises: identifying, in code for the protected item of software 260, an existing portion of code; modifying the existing portion of code to form the first portion of code; and using the first portion of code, instead of the existing portion of code, as part of the protected item of software 260. The above-mentioned code for the protected item of software 260 that is identified may comprise one or more instructions from the initial item of software 220 and/or one or more instructions that have been introduced by the software protection tool 252 already as part of generating the protected item of software 260.

For example, the step 302 may comprise identifying, in code for the protected item of software 260, an existing portion of code and modifying one or more instructions of the existing portion of code so that, by virtue of the modifications, the resulting modified existing portion of code (which forms the first portion of code) is useful to the attacker for performing an attack of the predetermined attack type. The identification of the existing portion of code may be carried out by the software protection tool 252 based on knowledge by the software protection tool 252 of the type of modifications that the software protection tool 252 is configured to perform along with knowledge by the software protection tool 252 of the types of portions of code that may be useful to the attacker for performing an attack of the predetermined attack type (so that the software protection tool 252 can identify an existing portion of code which the software protection tool 252 knows it is able to modify into a modified portion of code that may be useful to the attacker for performing an attack of the predetermined attack type).

As an example, suppose that the initial item of software 220 has instructions for a function f as shown below in the pseudocode of Example 3a

```
f
{
    ...
    inc dx
    ret
}
```

Example 3a

The software protection tool 252 may be arranged to change/modify the identification of particular registers. The software protection tool 252 may wish to generate a "decoy" gadget in the protected item of software 260 that involves the instructions inc cx and ret (since the software protection tool 252 knows that a gadget made up of the instructions inc cx and ret may be useful to an attacker). Therefore, the software protection tool 252 may identify, as an existing portion of the code for the protected item of software 260, the instructions inc dx and ret of the function f, since the software protection tool 252 knows (a) it can modify the identification of the register dx to be the register cx and (b) it knows that, by making such a modification, the resulting modified code would form a gadget made up of the instructions inc cx and ret that may be useful to an attacker. The software protected tool 252 may then modify the instruction inc dx so that it becomes inc cx, as shown in the pseudocode of Example 3b below.

```
f
{
    ...
    inc cx
    ret
}
```

Example 3b

It will be appreciated that other ways of including the first portion of code as part of the protected item of software 260 may be used.

At a step 304 of the method 300, the software protection tool 252 includes, as part of the protected item of software 260, a second portion of code, wherein the second portion of code enables, at run time of the protected item of software 260, a modification of at least part of the first portion of code. The step 304 may be performed at the same time as the step 302 or subsequent to the step 302.

Here, the second portion of code may comprise one or more instructions (such as machine language instructions or opcodes). In some embodiments, the second portion of code is included as a sequence of consecutive instructions in the protected item of software 260—however, it will be appreciated that this need not necessarily be the case for other embodiments. The second portion of code may, therefore, be viewed as one or more sections or parts or collections of instructions and/or data that the software protection tool 252 includes within, or as part of, the protected item of software 260.

The modification that the second portion of code enables may depend on the first portion of code and/or how the first portion of code was included as part of the protected item of software 260 and/or where, within the protected item of software 260, the first portion of code was included as part of the protected item of software 260. For example:

As mentioned above, the first portion of code may be included as part of the protected item of software 260 so that at least a part of the first portion of code is never executed when executing the protected item of software 260. The modification to the first portion of code, as enabled by the second portion of code, may be a modification to the at least a part of the first portion of code that is never executed. The actual modification performed may, then, be any modification at all, since the modified at least a part of the first portion of code will still never be executed and, therefore, the modification will not impact on the normal operation/execution of the protected item of software 260.

As mentioned above, the step 302 may involve identifying, in code for the protected item of software 260, an existing portion of code; modifying the existing portion of code to form the first portion of code; and using the first portion of code, instead of the existing portion of code, as part of the protected item of software 260. In this case, the modification enabled by the second portion of code may be arranged to change (or revert) the first portion of code back to the existing portion of code. In this way, the originally intended functionality of the existing portion of code will be maintained at run time.

In essence, the modification to the first portion of code as enabled by the second portion of code means that, if an attacker identifies some or all of the first portion of code as being useful in performing an attack of the predetermined type and therefore tries to use some or all of the first portion of code (e.g. as a gadget) in an attack of the predetermined type, then the instructions that the attacker would expect to be executed as part of his attack might not actually be executed, since some or all of the code in the first portion of code may be modified at run time by virtue of the second portion of code. This means that the attack may fail or, at the very least, the attack may execute in a manner that the attacker did not intend/expect and/or in a manner that is not useful to the attacker. As the modification to the first portion of code occurs at run time, prior static analysis of the protected item of software 260 by the attacker will not be of use. This makes it much more difficult for an attacker to automate the identification of useful gadgets and to successfully launch attacks against the protected item of software 260.

The second portion of code may be included at any point within the protected item of software 260. For example, the second portion of code may be included at a point within the protected item of software 260 so that the second portion of code is executed right at the beginning of run time for the protected item of software 260 (e.g. during an initialisation of the protected item of software 260). Alternatively, the second portion of code may be included at a point within the protected item of software 260 so that the second portion of code is executed at some later stage during the run time for the protected item of software 260—for example, if the first portion of code forms part of a function f, then the second portion of code may be included as instructions within/for the function f and at a location within the function f that precedes (in execution order) the instructions for the first portion of code; alternatively, if the first portion of code forms part of a function f, then the second portion of code may be included as instructions within/for a different function g that calls the function f and at a location within the function g that precedes (in execution order) the instructions that call the function f; etc.

The second portion of code may comprise code that itself (when executed) performs the modification of the first portion of code. Alternatively, the second portion of code may comprise instructions and/or data that provide a kernel of the processor that is executing the protected item of software 260 with a table or list of instructions for the kernel to then carry out the modifications to the first portion of code. It will be appreciated that, in other embodiments of the invention, the second portion of code enables the modification at run time of the first portion of code in other ways.

The method 300 may include an optional step, not show in FIG. 3a, of including, as part of the protected item of software 260, a further portion of code, wherein the further portion of code enables, at run time of the protected item of software 260, undoing of the modification of at least part of the first portion of code that the second portion of code enables. For example, if the first portion of code forms part of a function f and the second portion of code is included as instructions within/for a different function g that calls the function f and at a location within the function g that precedes (in execution order) the instructions that call the function f, then the further portion of code may be included as instructions within/for the function g (or a subsequently called function) and at a location that follows (in execution order) the first portion of code.

We turn, now, to the method 350 performed by the user system 280 when executing the protected item of software 260.

At a step 352, the user system 280 loads the protected item of software 260 (i.e. performs the usual operations carried out at load time). It will be appreciated, of course, that embodiments of the invention may be carried out with respect to code for a protected item of software 260 that has already been loaded (potentially by a different entity), and so the step 352 is optional.

At a step 354, the user system 280 executes the protected item of software 260 during run time for the protected item of software 260.

In particular, as discussed above, the protected item of software 260 comprises a second portion of code which enables, at run time of the protected item of software 260, modification of at least part of a first portion of code within the protected item of software 260. Consequently, the step 354 comprises modifying, at run time of the protected item of software 260, at least part of the first portion of code.

As mentioned above, this modification to at least part of the first portion of code may be performed at various points in time (e.g. just after load time, at the step 352, has finished or at some later point during run time). Also, as mentioned above, this modification may be performed directly by executing the second portion of code, or may be performed by a kernel (where the second portion of code has configured or primed the kernel to carry out the modification at some stage), or by some other means that the second portion of code enables.

As mentioned above, the method 300 may include an optional step, not show in FIG. 3a, of including, as part of the protected item of software 260, a further portion of code, wherein the further portion of code enables, at run time of the protected item of software 260, undoing of the modification of at least part of the first portion of code that the second portion of code enables. Therefore, the method 350 may include an optional step, not shown in FIG. 3b, of undoing the modification of at least part of the first portion of code that the second portion of code enables. The comments above in relation to how this modification of the first portion of code is enabled and when the modification takes place apply analogously to how the "undoing" of the modification is enabled by the further portion of code and when this undoing takes place.

As at least part of the first portion of code is to be modified at the step 354, at the time this modification is made, this at least part of the first portion of code needs to be loaded in a portion of memory that is both executable and writable. In some embodiments, the user system 280 may always load code (at the load time step 352) into memory that is both executable and writable, so that nothing further needs to be carried out for this. In other embodiments, the software protection tool 252 may be arranged, as part of forming the protected item of software 260, to configure the protected item of software 260 so that one or more amounts of the code of the protected item of software 260 will be loaded (at the load time step 352) into memory that is both executable and writable, where these one or more amounts of code comprise the first portion of code. Methods of doing this are well-known (such as setting certain memory pages to be executable and writable via a system call to a kernel) and shall not, therefore, be described in detail herein.

It will be appreciated that it is possible that the above-mentioned measures for protecting an item of software 220 (i.e. generating a protected item of software 260) may not thwart all attacks on the protected item of software 260. For example, the attacker, when generating a library of gadgets, may select gadgets for the library that happen to not be ones that have instructions which are modified during run time (by virtue of the above first type of protection). Moreover, it is possible that an attacker may be able to identify somehow the second portion of code that is included and nullify its effect (so that the modification of the first portion of code is not effected at run time). It would, therefore, be desirable to be able to detect and/or thwart attacks that might be in progress at run time.

FIGS. 4a, 4b and 4c, and FIGS. 5a and 5b schematically illustrate embodiments of the invention that make use of a second type of software protection (or attack countermeasure). This second type of software protection (or attack countermeasure) may be used in addition to, or independent of, the above-mentioned first type of software protection (as described with reference to FIGS. 3a and 3b).

Figure 4A:
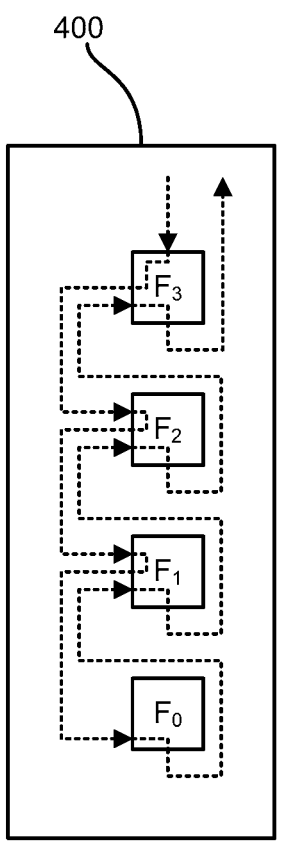
FIGS. 4a, 4b and 4c schematically illustrate various arrangements for code for a first function $F_0$ and one or more second functions $F_i$ (i=1, . . . , N), i.e. corresponding execution paths.
Figure 4B:
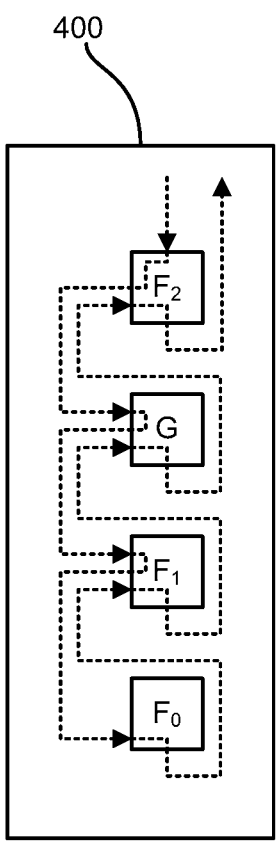
Figure 4C:
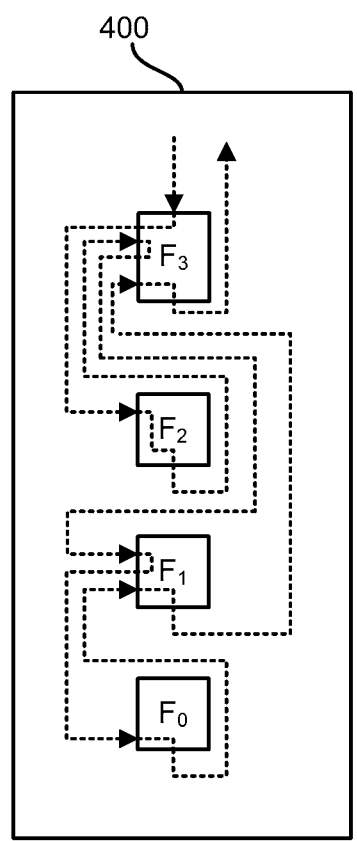

With this second type of software protection, the code for the protected item of software 260 is to have (a) code for a first function $F_0$ and (b) code for one or more second functions $F_i$ (for i=1, . . . , N, where N is a positive integer). Additionally, within the code for the protected item of software 260, there is an execution path (or a control flow path, or sequence of function calls) that causes code for the one or more second functions $F_i$ (i=1, . . . , N) to be executed before executing the code for the first function $F_0$ (i.e. at least part of the code for each of the one or more second functions $F_i$ (i=1, . . . , N) is executed before executing the code for the first function $F_0$). FIGS. 4a, 4b and 4c schematically illustrate various arrangements for the code for the first function $F_0$ and the one or more second functions $F_i$ (i=1, . . . , N), i.e. corresponding execution paths, as described in more detail below.

FIG. 4a schematically illustrates code 400 for the protected item of software 260 (indeed, the code 400 and the protected item of software 260 may be considered to be one and the same thing). The code 400 comprises code for the first function $F_0$ and code for three second functions $F_1$, $F_2$ and $F_3$. An execution path within the code 400 is illustrated by a dashed line. In particular, as can be seen, the functions $F_0$, $F_1$, $F_2$ and $F_3$ may be called in a serial manner, one after the other, i.e. for i=1, . . . , N, function $F_i$ is arranged (as at least a part of the processing for the function $F_i$) to call function $F_0$. It will be appreciated that, in this example, N=3; however, embodiments of the invention may make use of other values of N.

FIG. 4b schematically illustrates code 400 for the protected item of software 260. The code 400 comprises code for the first function $F_0$ and code for two second functions $F_1$ and $F_2$, as well as code for another function G. An execution path within the code 400 is illustrated by a dashed line. In particular, as can be seen, the functions $F_0$, $F_1$, G and $F_2$ may be called in a serial manner, one after the other. This is similar to the arrangement shown in FIG. 4a, except that the function G is called between the calls to the function $F_1$ and $F_2$ (i.e. function $F_2$ calls function G, which calls function $F_1$). FIG. 4b is included to illustrate that the execution path within the code 400 may involve executing one or more functions in addition to the first function $F_0$ and the one or more second functions $F_i$ (i=1, . . . , N). It will be appreciated that, in this example, N=2; however, embodiments of the invention may make use of other values of N. Similarly, it will be appreciated that, in this example, there is a single additional function G and that this additional function G is between the functions $F_2$ and $F_1$; however, in other embodiments of the invention, there may be different numbers of additional functions G in the execution flow and they may be located in the execution flow at different locations.

FIG. 4c schematically illustrates code 400 for the protected item of software 260. The code 400 comprises code for the first function $F_0$ and code for three second functions $F_1$, $F_2$ and $F_3$. An execution path within the code 400 is illustrated by a dashed line. In particular, as can be seen, unlike the example shown in FIG. 4a, the functions $F_0$, $F_1$, $F_2$ and $F_3$ are not called in a serial manner—instead: the function $F_3$ calls the function $F_2$; once execution of the function $F_2$ has been completed, control returns the function $F_3$, at some point after which the function $F_3$ calls the function $F_1$; the function $F_1$ then calls the function $F_0$. Again, it will be appreciated that, in this example, N=3; however, embodiments of the invention may make use of other values of N.

It will be appreciated that other execution paths or control flow paths that involve a first function $F_0$ and one or more second functions $F_i$ (i=1, . . . , N) and that cause code for the one or more second functions $F_i$ (i=1, . . . , N) to be executed before executing the code for the first function $F_0$, may be used, or implemented, within the code 400 for the protected item of software 260. The execution paths shown in FIGS. 4a, 4b and 4c are merely examples to aid understanding, and other execution paths may be more or less complex, and may take on different shapes or flow topologies/structures. Indeed, the same function may occur multiple times within an execution path.

Additionally, it will be appreciated that there may be multiple different possible execution paths or control flow paths used, or implemented, within the code 400 for the protected item of software 260 that involve the first function $F_0$ and the one or more second functions $F_i$ (i=1, . . . , N) that cause code for the one or more second functions $F_i$ (i=1, . . . , N) to be executed before executing the code for the first function $F_0$. For example, within the code 400 for the protected item of software 260, both execution paths involving $F_0$, . . . , $F_3$ as shown in FIGS. 4a and 4c may be possible/valid, with the actual execution path that is used being dependent on run time data and decisions/processing carried out.

It will also be appreciated that there may be one or more other possible execution paths or control flow paths used, or implemented, within the code 400 for the protected item of software 260 that involve the first function $F_0$ but that do not necessarily involve all of the one or more second functions $F_i$ (i=1, . . . , N).

As used herein, the term "function" shall be taken to mean one or more of a subroutine, a program function, a procedure, or any other callable snippet of code.

In the absence of an attack against the protected item of software 260 when the code for the protected item of software 260 is being executed by the user system 280, the first function $F_0$ is arranged to provide first functionality. This first functionality may be any functionality desired or intended for the protected item of software 260, i.e. any functionality that a developer of the initial item of software 220 may desire to be provided, or achieved, during "normal" (i.e. non-attacked) operation or execution of the protected item of software 260. This first functionality may be any such desired operations and/or processing, such as one or more of: (i) performing one or more calculations; (ii) performing a test of one or more items of data; (iii) performing a data validation (which may result in the first functionality permitting or denying access to other functionality or processing data in a manner depending on the validation); (iv) performing a password verification (which may result in the first functionality permitting or denying access to other functionality); etc. The first functionality may also be taken to include the return address (i.e. the address of an instruction) at which execution is to resume after execution of the first function $F_0$ has completed (since the first function $F_0$ may well include one or more return or jump statements to exit/terminate the first function $F_0$)—i.e. where execution or control flow should continue (i.e. in the absence of an attack, where execution or control flow is intended/desired to continue) after the first function $F_0$ has been carried out or completed. The nature and complexity of the first functionality provided by the first function $F_0$ is not important, other than it is the functionality that was initially intended or desired from the function $F_0$, i.e. the operations/processing which would be provided under the conditions where an attacker is not performing an attack.

As mentioned above, ROP attacks involve stack smashing, i.e. writing (or overwriting) data on the stack so that execution flow is modified. This may be achieved, for example, by the attacker identifying a buffer overflow vulnerability in the item of software which effectively enables the attacker to write to the stack whatever data the attacker wishes place on the stack. Other types of stack smashing attack (not necessarily ROP attacks) are known.

As discussed above, for the protected item of software 260, there will be one or more "legitimate" (or "expected"/"anticipated") execution paths (or control flow paths) that involve the first function $F_0$ and the one or more second functions $F_i$ (i=1, . . . , N) that cause code for the one or more second functions $F_i$ (i=1, . . . , N) to be executed before executing the code for the first function $F_0$. However, when a stack smashing attack is carried out (e.g. when performing a ROP attack), the attacker may overwrite one or more function call return addresses on the stack so that the stack indicates a different "illegitimate" execution path for arriving at the execution of the first function $F_0$. This may occur, for example, prior to execution of the first function $F_0$, i.e. so that the execution path actually used to arrive at execution of the first function $F_0$ was not a legitimate execution path. This may also occur, for example, whilst executing the first function $F_0$—i.e. the writing to the stack as part of the stack smashing attack may occur during, or as part of, the execution of the first function $F_0$ (for example, if the first function $F_0$ or a function that it calls has a buffer overflow vulnerability that the attacker has exploited). In this case, the execution path actually used to arrive at execution of the first function $F_0$ may have been a legitimate execution path, but during execution of the first function $F_0$, the attack changes the stack to represent an illegitimate execution path—this means that the function call returns will not be in accordance with a legitimate execution path. Embodiments of the invention that make use of the second protection type may detect and/or respond to changes that involve the stack representing an illegitimate execution path.

Figure 5A:
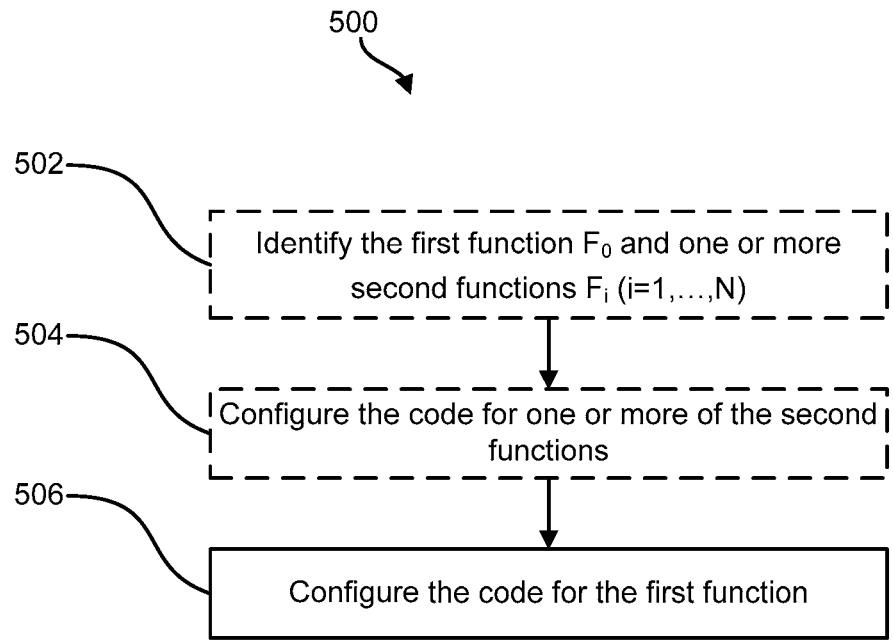
FIGS. 5a and 5b are flow charts that schematically illustrate embodiments of the invention that make use of a second type of software protection (or attack countermeasure)
Figure 5B:
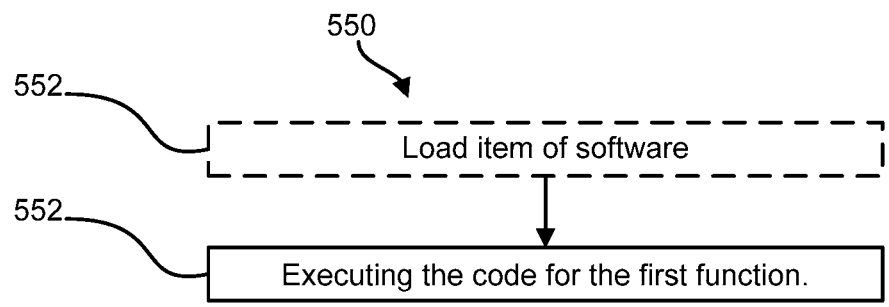

FIG. 5a is a flow chart illustrating a method 500, according to an embodiment of the invention, performed by the software protection tool 252 to generate a protected item of software 260; whilst FIG. 5b is a flow chart illustrating a method 550, according to an embodiment of the invention, performed by the user system 280 when executing the protected item of software 260.

We turn, first, to the method 500 performed by the software protection tool 252 to generate a protected item of software 260. It will be appreciated that the software protection tool 252 may apply one or more other protections or attack countermeasures, in addition to those described below with reference to the method 500, to the initial item of software 220 in order to generate a protected item of software 260.

At a step 502 of the method 300, the first function $F_0$ and the one or more second functions $F_i$ (i=1, . . . , N) are identified. In other words, an execution path (namely a "legitimate" execution path) is identified, that involves a first function $F_0$ and one or more second functions $F_i$ (i=1, . . . , N) and that causes code for the one or more second functions $F_i$ (i=1, . . . , N) to be executed before executing the code for the first function $F_0$. In some embodiments, this legitimate execution path may have been previously identified and indicated to the software protection tool 252—hence, in FIG. 5a, the step 502 is shown as optional.

The first function $F_0$ may be any function for the protected item of software 260, and may be a function that already exists in the initial item of software 220 or may be a function that the software protection tool 252 introduces as part of the protected item of software 260 as part of forming the protected item of software 260. Similarly, each of the one or more second functions $F_i$ (i=1, . . . , N) may, respectively, be any function in a legitimate execution path that arrives at, or causes execution of, the identified first function F0. One of more of the second functions $F_i$ (i=1, . . . , N) may be a function that already exists in the initial item of software 220 or may be a function that the software protection tool 252 introduces as part of the protected item of software 260 as part of forming the protected item of software 260.

With embodiments of the invention execution of the code, in the protected item of software 260, for the one or more second functions $F_i$ (i=1, . . . , N) causes data to be stored at one or more memory locations, where this data satisfies a set of one or more predetermined properties. FIG. 6a schematically illustrates the storage of data by the one or more second functions $F_i$ (i=1, . . . , N). In particular, data D is shown as being stored across three memory locations 602 within a memory 600 (which could, for example, be a stack). The data D is formed from data items A, B, C that are being stored at respective memory locations—these data items A, B, C are data items written to, or stored in, the memory 600 due to execution of code of the one or more second functions $F_i$ (i=1, . . . , N). It will, of course, be appreciated the different numbers of memory locations 602 are envisaged and that different quantities of data may be stored at these memory locations 602 other than what is shown in FIG. 6a.

Examples of the type of data D and the one or more predetermined properties shall be set out shortly.

In the absence of an attack being performed, the data D satisfies the set of one or more predetermined properties at a point in time, during the execution of code for the protected item of software 260, at which the code for the first function $F_0$ is to be executed.

As mentioned above, if a stack smashing attack is being performed (or some other kind of attack is being performed in which an attacker may modify the contents of the memory 600), the contents of the data D may be changed as a result of the attack. FIG. 6b schematically illustrates an example of the effect that an attack might have on the storage of data D in the one or more memory locations 602. As can be seen, instead of the data D stored at the one more memory locations 602 being the data D={A,B,C}, the data D stored at the one more memory locations 602 is now the data D={A,B*,C*}.

It may be that, with a particular set of one or more second functions $F_i$ (i=1, . . . , N), execution of the existing code for those one or more second functions $F_i$ (i=1, . . . , N) (such as initial code in the initial item of software 220 for the one or more second functions $F_i$ (i=1, . . . , N)) may already result in data D being stored at one or more memory locations 602, where this data D satisfies this set of one or more predetermined properties. For example, the data D to be stored may comprise one or more predetermined values that the code for the one or more second functions $F_i$ (i=1, . . . , N) may already be configured to store on the stack; similarly, the data D to be stored may comprise one or more function call return addresses which are automatically placed on the stack due to execution of code for the one or more second functions $F_i$ (i=1, . . . , N). In such cases, the one or more second functions $F_i$ (i=1, . . . , N) are already suited for use in this second type of protection for the protected item of software 260.

However, it may be that, with a particular set of one or more second functions $F_i$ (i=1, . . . , N), execution of the existing code for those one or more second functions $F_i$ (i=1, . . . , N) (such as initial code in the initial item of software 220 for the one or more second functions $F_i$ (i=1, . . . , N)) does not result in data D being stored at one or more memory locations 602, where this data D satisfies the set of one or more predetermined properties. In this case, the method 500 may include an optional step 504 of configuring code, for inclusion as part of the protected item of software 260, for the one or more second functions $F_i$ (i=1, . . . , N) so that execution of the configured code for the one or more second functions $F_i$ (i=1, . . . , N) does result in data D being stored at one or more memory locations 602, where this data D satisfies the set of one or more predetermined properties. This may involve modifying the initial code, in the initial item of software 220, for at least one of the one or more second functions $F_i$ (i=1, . . . , N) to generate the code, for use in the protected item of software 260, for at least one of the one or more second functions $F_i$ (i=1, . . . , N).

At a step 506, the method 500 code (for use as part of the protected item of software 260) for the first function $F_0$ is configured so that execution, by one or more processors, of the code for the first function $F_0$ provides the above-mentioned first functionality only if the set of one or more predetermined properties is satisfied by data D being stored, when the first function is executed, at the one or more memory locations 602.

We turn next to the method 550 performed by the user system 280 when executing the protected item of software 260.

At a step 552, the user system 280 loads the protected item of software 260 (i.e. performs the usual operations carried out at load time). It will be appreciated, of course, that embodiments of the invention may be carried out with respect to code for a protected item of software 260 that has already been loaded (potentially by a different entity), and so the step 552 is optional.

At a step 554, the user system 280 executes the protected item of software 260 during run time for the protected item of software 260. In particular, this involves executing the code for the first function $F_0$. As mentioned above, the execution of the first function $F_0$ provides the first functionality only if the set of one or more predetermined properties is satisfied by data D being stored, when the first function $F_0$ is executed, in the one or more memory locations 602.

Examples of how this works, and is achieved, are provided below.

Firstly, turning to types of data D that may be stored in the one or more locations 602 in the memory 600 as a result of execution of code for the one or more second functions $F_i$ (i=1, . . . , N):

(a) The data D stored as a result of execution of code for the one or more second functions $F_i$ (i=1, . . . , N) may comprise one or more predetermined values. For example, code for a second function $F_i$ may comprise an instruction which stores a predetermined value for a variable on the stack, such as a C/C++ instruction int x=204 which would cause data representing the value 204 to be stored at a location on the stack (such as the data item A shown in FIG. 6a).

(b) The data D stored as a result of execution of code for the one or more second functions $F_i$ (i=1, . . . , N) may comprise one or more values determined, at least in part, by a calculation performed when executing at least one of the one or more second functions $F_i$ (i=1, . . . , N). For example, code for a second function $F_i$ may comprise an instruction which stores the sum of two variables as a third variable on the stack, such as a C/C++ instruction int z=x+y; or, as another example, code for a second function $F_i$ may comprise an instruction which updates, on the stack, the value for a variable to be an incremented version of the existing value of the variable, such as a C/C++ instruction x++; or, as another example, code for a second function $F_i$ may comprise an instruction which sets or calculates the value a variable on the stack by calling a function, such as a C/C++ instruction x=f (y) for some function f.

(c) The data D stored as a result of execution of code for the one or more second functions $F_i$ (i=1, . . . , N) may comprise an address of an instruction within one of the one or more second functions $F_i$ (i=1, . . . , N) at which execution is to resume after execution of a function called by the one of the one or more second functions $F_i$ (i=1, . . . , N) has finished, i.e. a return address for the call to that function. This called function may be the first function $F_0$ or one of the one or more second functions $F_i$ (i=1, . . . , N), but this need not necessarily be the case.

It will be appreciated that the data D stored at the one or more memory locations 602 may comprise one or more of the above example data types (a)-(c). Additionally, or alternatively, the data D stored at the one or more memory locations 602 may comprise one or more different types of data.

In some embodiments, satisfaction of the one or more predetermined properties by the data D being stored, when the first function F0 is executed, in the one or more memory locations 602 is indicative that the one or more second functions $F_i$ (i=1, . . . , N) and the first function $F_0$ have been called in a predetermined order (i.e. the data D is indicative that a legitimate execution flow/path has been used to arrive at the execution of the first function $F_0$). Analogously, in some embodiments, a lack of satisfaction of the one or more predetermined properties by the data D being stored, when the first function $F_0$ is executed, in the one or more memory locations 602 is indicative that the one or more second functions $F_i$ (i=1, . . . , N) and the first function $F_0$ have been not called in a predetermined order (i.e. the data D is indicative that an illegitimate execution flow/path may have been used to arrive at the execution of the first function $F_0$). For example, if there are two second functions $F_1$ and $F_2$ and the functions $F_1$ and $F_2$ are arranged to store corresponding predetermined values $v_1$ and $v_2$ as data in the one or more memory locations 602, then (a) the presence of the values $v_1$ and $v_2$ in those one or more memory locations 602 suggests that the functions $F_1$ and $F_2$ have been called as part of the execution flow to arrive at execution of the first function $F_0$; whereas (b) the presence of the values other than v1 and v2 in those one or more memory locations 602 suggests that the functions $F_1$ and $F_2$ have not been called as part of the execution flow to arrive at execution of the first function $F_0$.

The software protection system 252 may use any set of one or more predetermined properties (and may be configurable to use a particular set selected from a group of available sets). Examples of such predetermined properties and how they should be satisfied are set out below.

Satisfaction of the set of one or more predetermined properties by data D stored at the one or more memory locations 602 may be based, at least in part, on whether at least a part of the data D being stored at the one or more memory locations 602 has (or assumes) a predetermined value—here, the predetermined property is that "a part of the data D being stored at the one or more memory locations 602 has (or assumes) a predetermined value". With data items of any of types (a)-(c) above, the set of one or more predetermined properties may be satisfied by data D stored at the one or more memory locations 602 only if a value forming part of that data D has (or assumes) a predetermined value. For data of type (a), this predetermined value is the predetermined value that should be stored by execution of the code for the one or more second functions $F_i$ (i=1, . . . , N); for data of type (b), this predetermined value is an expected value that, in the absence of an attack, should be obtained by (or should result from) the calculation performed when executing at least one of the one or more second functions $F_i$ (i=1, . . . , N); for data of type (c), this predetermined value is an expected return address, i.e. an address at which execution is expected to resume (and therefore an address which is expected to have been placed on the stack) after execution of a function called by the one of the one or more second functions $F_i$ (i=1, ..., N) has finished.

Satisfaction of the set of one or more predetermined properties by data D stored at the one or more memory locations 602 may be based, at least in part, on whether two or more items of the data D being stored at the one or more memory locations 602 have a predetermined relationship. The predetermined relationship may be any kind of relationship, such as a relationship involving one or more of: whether one stored item of data is greater than or less than another stored item of data; whether some function of two or more items of data satisfies a particular condition (such as the result of the function being a predetermined value or greater than or less than a predetermined value); whether a difference between two items of data satisfies a particular condition. Here, the predetermined property is that "two or more items of the data D being stored at the one or more memory locations 602 have a predetermined relationship". This type of property is particularly useful when the absolute values of two or more stored items of data are not known in advance, but their relative values are known in advance. For example, the absolute values of two return addresses (type (c) data) may not be known in advance (i.e. prior to load time), but the difference between the two return addresses may be known in advance and, therefore, if the data D is to comprise these two return addresses, satisfaction of the set of one or more predetermined properties by data D stored at the one or more memory locations 602 may occur only if the difference between the two values stored in the memory locations 602 where the two return addresses are expected to be stored is a predetermined value.

In some embodiments, the code for the first function $F_0$ is configured at the step 506 so that, upon finishing execution of the first function $F_0$, execution of the code for the protected item of software 260 resumes at an address that is dependent on at least a part of the data D stored as a result of execution of the code for the one or more second functions $F_i$ (i=1, ..., N). Put another way, at least a part of the data D being stored at the one or more memory locations 602 enables determination of an address of an instruction to which execution flow is to continue in order to provide the first functionality. For example:

Suppose the first function $F_0$ is called by the second function $F_1$. The code for the first function $F_0$ may be configured to be along the lines of the following pseudocode of Example 4 below:

```
F0
{
    ...
    mov bx, [sp]
    ...
    jmp bx
}
```

Example 4

In this example, the value of sp is loaded into the register bx by the mov instruction. The execution of the code for the first function $F_0$ terminates with the instruction jmp bx, which causes execution to continue at an address indicated by the value stored in the register bx. If the value of sp forms part of the data D stored in the one or more memory locations 602, then (in the absence of an attack) execution of the code for the protected item of software 260 resumes at an address that is dependent on at least a part of the data D stored by execution of the code for the one or more second functions $F_i$ (i=1, ..., N). For example, the function $F_1$ may, as part of calling the function $F_0$ store a return execution address within the function $F_1$ as the value sp.

It will be appreciated that the value sp may be calculated by the first function $F_0$ based on data D stored in the one or more memory locations 602.

Naturally, if the value sp is not the expected/correct value that would have occurred from unattacked execution of the code for the one or more second functions $F_i$ (i=1, ..., N), then termination of the execution of the first function $F_0$ causes execution to continue at an unintended address, which thereby means that the first functionality is not provided.

As another example of this, the code for the first function $F_0$ may be configured to be along the lines of the following pseudocode of Example 5 below:

```
F0
{
    ...
    mov bx, [sp]
    xor bx, cx
    ...
    xor bx, 0xABCD
    jmp bx
}
```

Example 5

Example 5 works in the same way as Example 4, except that the value in the register bx is XOR-ed with the value cx and, later on, the value in the register bx is XOR-ed with a predetermined value (namely 0xABCD in this example). The execution of the code for the first function $F_0$ terminates with the instruction jmp bx, which causes execution to continue at an address indicated by the value stored in the register bx. If the value cx forms part of the data stored in the one or more memory locations, then (in the absence of an attack) execution of the code for the protected item of software 260 resumes at an address that is dependent on at least a part of the data stored by execution of the code for the one or more second functions $F_i$ (i=1, ..., N). For example, one of the one or more second functions $F_i$ (i=1, ..., N) may store the predetermined value (namely 0xABCD in this example) as the value cx, so that, effectively, the two XORs cancel each other out. Naturally, if the value cx is not the expected/correct value that would have occurred from unattacked execution of the code for the one or more second functions $F_i$ (i=1, ..., N), then termination of the execution of the first function $F_0$ causes execution to continue at an unintended address, which thereby means that the first functionality is not provided.

In a further modification to this example, the predetermined value in the code (0xABCD in this case) may be replaced by data that is dependent, at least in part, on the data D being stored in the one or more memory locations 602. In this way, the two XORs will only work correctly together if, for example, two items of data within the data D have a predetermined relationship (e.g. are equal to each other).

In such embodiments, the address at which execution of the code for the protected item of software 260 resumes after finishing execution of the first function $F_0$ is dependent on at least a part of the data D stored by execution of the code for the one or more second functions $F_i$ (i=1, . . . , N). The function $F_0$ may be arranged so that this return address avoids executing one or more dummy instructions (such as one or more dummy instructions which the software protection tool 252 may have included in the function that called the first function $F_0$). This could be achieved, for example, by combining the "normal" return address within the function that called the first function $F_0$ (as stored on the stack) with another value stored in the one or more memory locations (such as a predetermined value representing an address offset)—for example, by adding an offset to the "normal" return address, where the offset is sufficient to avoid execution of the dummy instructions.

As an example of this, the code for the first function $F_0$ may be configured to be along the lines of the following pseudocode of Example 6 below:

---

$F_0$
{
    ...
    mov bx, [sp-1234]
    xor bx, cx
    ...
    xor bx, 0xABCD
    jmp bx
}

---

Example 6

This is the same as Example 5, except that a fixed/predetermined offset (such as the value 1234 used above) is used to determine the return address. In alternative examples, the offset could be a value that forms part of the data D.

As mentioned above, the first functionality is performed only if the set of one or more predetermined properties is satisfied by data D being stored, when the first function $F_0$ is executed, at the one or more memory locations 602. Therefore, satisfaction of the set of one or more predetermined properties by data D being stored, when the first function $F_0$ is executed, at the one or more memory locations 602 is a necessary condition for the first functionality to be provided as a consequence of execution of the first function $F_0$. In some embodiments, this may not be a sufficient condition—in particular, one or more other criteria may need to be satisfied in order for the first functionality to be provided as a consequence of execution of the first function $F_0$ (for example due to one or more other protection techniques having been applied to generate the protected item of software 260).

The configuring of the code for the first function $F_0$, at the step 506, is arranged so that execution, by one or more processors, of the code for the first function provides a second functionality, different from the first functionality, if the set of one or more predetermined properties is not satisfied by data D being stored, when the first function is executed, at the one or more memory locations 602. This second functionality may be random functionality (for example, if the return address at which execution of the code for the protected item of software 260 is to resume after executing the first function $F_0$ depends, at least in part, on data stored in the one or more locations, then if invalid (or unexpected) data is stored in the one or more locations, then this return address may be any address, so that the subsequent instructions that are executed may not be known in advance.

However, in some embodiments, the second functionality may be predetermined. As an example, the configuring of the code for the first function $F_0$, at the step 506, comprises including, as part of the code for the first function $F_0$, a portion of code which, when executed by the one or more processors, causes the one or more processors to: (a) determine whether or not the set of one or more predetermined properties is satisfied by data D being stored, when the first function is executed, at the one or more memory locations 602; and (b) if the set of one or more predetermined properties is determined to not be satisfied, provide the second predetermined functionality (that is different from the first functionality). In other words, the portion of code may have instructions for carrying out an explicit test/check on whether or not the set of one or more predetermined properties is satisfied, with a branch point based on the outcome of the test (i.e. provide the first functionality if the test indicates that the set of one or more predetermined properties is satisfied and provide the predetermined section functionality if the test indicates that the set of one or more predetermined properties is not satisfied). As an example, this portion of code may be arranged to compare a value from the data D being stored in the one or more memory locations 602 against a predetermined value and, if the stored value does not equal the predetermined value, then it is determined that set of one or more predetermined properties is not satisfied. It will be appreciated that other tests or operations for the determination may be used, depending on the nature of the set of one or more predetermined properties.

Here, this portion of code may comprise one or more instructions (such as machine language instructions or opcodes). In some embodiments, this portion of code is included as a sequence of consecutive instructions in the code for the first function $F_0$—however, it will be appreciated that this need not necessarily be the case for other embodiments. The portion of code may, therefore, be viewed as one or more sections or parts or snippets or collections of instructions that the software protection tool 252 includes within, or as part of, the code for the first function $F_0$.

The portion of code may be included as part of the code for the first function $F_0$ in proximity to a return point in the code for the first function $F_0$ (e.g. adjacent to, or near to, a return instruction or the actual end of the code for the first function $F_0$). In this way, the portion of code may be executed when, or just before, execution of the first function $F_0$ terminates—thus, if the attacker has exploited a buffer overflow vulnerability in the first function $F_0$ (or in code for a function called through execution of the first function $F_0$) to launch an attack, then the attack may be detected before the execution of the first function $F_0$ terminates and before the "corrupted"/"attacked" return address on the stack is subsequently used to determine where execution should continue—the second functionality may therefore prevent a "corrupted"/"attacked" return address that the attacker has overwritten on the stack from being used.

Alternatively, the portion of code may be included as part of the code for the first function $F_0$ in proximity to the start of the code for the first function $F_0$ (e.g. as, or adjacent to, or near to, the first instruction of the code for the first function $F_0$). In this way, the portion of code may be executed at, or just after, execution of the first function $F_0$ begins. Thus, if the attacker has caused the first function $F_0$ to be called via an illegitimate execution flow, this can be detected early on before much (or any) of the code for the first function $F_0$ has been executed, so that provision of the first functionality can be avoided and provision of the second functionality can be provided instead.

As discussed above, the second predetermined functionality may be dependent on the data D being stored, when the first function is executed, at the one or more memory locations 602. However, in some embodiments, the second predetermined functionality may be independent of the data D being stored, when the first function is executed, at the one or more memory locations 602. For example, the second predetermined functionality may be implemented by calling a function that causes premature termination of execution of the protected item of software 260, and/or that reports an error, and/or that implements one or more other countermeasures.

As mentioned above, the configuring of the code for the first function $F_0$, at the step 506, may comprise including, as part of the code for the first function $F_0$, a portion of code that has instructions for carrying out an explicit test on whether or not the set of one or more properties is satisfied. In alternative embodiments, the configuring of the code for the first function $F_0$, at the step 506, may comprise arranging the code for the first function $F_0$ to actually use the data D stored at the one or more memory locations 602 for the (normal) computations for the first function $F_0$—an explicit test on whether or not the set of one or more properties is satisfied may therefore not necessarily be carried out. This may involve including, as part of the code for the first function $F_0$, one or more new instructions and/or modifying one or more existing instructions for the first function $F_0$ (where these new and/or modified instructions are for the first function $F_0$ to actually use the data D stored at the one or more memory locations 602 for the (normal) computations for the first function $F_0$). For example: (a) referring to Example 4 above, the step 506 may involve including one or both of the mov bx, sp and jmp bx instructions as part of the instructions/code for the first function $F_0$; (b) referring to Example 5 above, the step 506 may involve including one or both of the mov bx, sp, xor bx, cx, xor bx, 0xABCD, and jmp bx instructions as part of the instructions/code for the first function $F_0$. It will, however, be appreciated that these are merely examples and that embodiments of the invention may involve including/modifying instructions in different ways.

As mentioned above, there may be multiple "legitimate" execution paths within the code for the protected item of software 260 (or the initial item of software 220) that result in execution of the first function $F_0$. Therefore, in some embodiments, the step 502 may involve identifying a plurality (e.g. all) of such legitimate execution paths that result in execution of the first function $F_0$ and the step 504 may be performed for each identified execution path. In this way, the first function $F_0$ may be arranged to provide the first functionality provided that execution of the first function $F_0$ has been arrived at via any legitimate execution path (so that the first function $F_0$ may be arranged to provide the first functionality in the absence of an attack).

3—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of generating a protected item of software, there being an execution path within code for the protected item of software that causes code for one or more second functions to be executed before executing code for a first function, wherein execution of the code for the one or more second functions causes data to be stored at one or more memory locations, the data satisfying a set of one or more predetermined properties, wherein, in the absence of an attack against the protected item of software when the code for the protected item of software is being executed, the first function is arranged to provide first functionality, the method comprising:

configuring the code for the first function so that execution, by one or more processors, of the code for the first function provides the first functionality only if the set of one or more predetermined properties is satisfied by data stored at the one or more memory locations when the function is executed, wherein said configuring is arranged so that execution, by the one or more processors, of the code for the first function provides a second predetermined functionality that is different from the first functionality and predetermined in the protected item of software, if the set of one or more predetermined properties is not satisfied by data being stored at the one or more memory locations when the first function is executed.

2. The method of claim 1, wherein said configuring comprises including, as part of the code for the first function, a portion of code which, when executed by the one or more processors, causes the one or more processors to:

determine whether or not the set of one or more predetermined properties is satisfied by data being stored, when the first function is executed, at the one or more memory locations; and if the set of one or more predetermined properties is determined to not be satisfied, provide the second predetermined functionality.

3. The method of claim 2, wherein the portion of code is included as part of the code for the first function in proximity to a return point in the code for the first function or in proximity to a start of the code for the first function.

4. The method of claim 2, wherein the second predetermined functionality is independent of the data being stored, when the first function is executed, at the one or more memory locations.

5. The method of claim 1, comprising receiving an initial item of software, wherein the code for the initial item of software comprises initial code for the first function, wherein said configuring comprises modifying the initial code for the first function to generate the code for the first function for the protected item of software.

6. The method of claim 5, wherein the code for the initial item of software comprises initial code for at least one of the one or more second functions, wherein the method comprises modifying the initial code for the at least one of the one or more second functions to generate the code for at least one of the one or more second functions for the protected item of software.

7. The method of claim 1, wherein the data being stored, when the first function is executed, at the one or more memory locations satisfying the one or more predetermined properties is indicative that the one or more second functions and the first function have been called in a predetermined order.

8. The method of claim 1, wherein the data being stored, when the first function is executed, at the one or more memory locations not satisfying the one or more predetermined properties is indicative that the one or more second functions and the first function have not been called in a predetermined order.

9. The method of claim 1, wherein the first function is a function $F_0$ and, together, the one or more second functions and the first function form a group of functions $F_i$ for $i=0, \ldots, N$, where N is a positive integer, and wherein, for each $i=1, \ldots, N$, the function $F_i$ is arranged to call the function $F_{i-1}$.

10. The method of claim 1, wherein the data stored by execution of the code for the one or more second functions comprises one or more of:

(a) one or more predetermined values;
(b) one or more values determined, at least in part, by a calculation performed when executing at least one of the one or more second functions;
(c) an address of an instruction within one of the one or more second functions at which execution is to resume after execution of a function called by the one of the one or more second functions has finished.

11. The method of claim 1, wherein the code for the first function is configured so that, upon finishing execution of the first function, execution of the code for the item of software resumes at an address that is dependent on at least a part of the data stored by execution of the code for the one or more second functions.

12. The method of claim 11, wherein the execution of the code for the item of software resuming at the address that is dependent on at least a part of the data stored by execution of the code for the one or more second functions avoids execution of one or more dummy instructions.

13. The method of claim 1, wherein the one or more memory locations comprises at least one location on a stack.

14. The method of claim 1, wherein satisfaction of the set of one or more predetermined properties by data stored at the one or more memory locations is based, at least in part, on one or more of:

(a) at least a part of the data being stored at the one or more memory locations having a predetermined value;
(b) two or more items of data being stored at the one or more memory locations having a predetermined relationship; and
(c) at least a part of the data being stored at the one or more memory locations enabling determination of an address of an instruction to which execution flow is to continue in order to provide the first functionality.

15. The method of claim 1, where the second predetermined functionality is independent of the data being stored, when the first function is executed, at the one or more memory locations.

16. A method of executing an item of software, there being an execution path within code for the item of software that causes code for one or more second functions to be executed before executing code for a first function, wherein execution of the code for the one or more second functions causes data to be stored at one or more memory locations, the data satisfying a set of one or more predetermined properties, wherein, in the absence of an attack against the item of software when the code for the item of software is being executed, the first function is arranged to provide first functionality, the method comprising:

executing, by one or more processors, the code for the first function, wherein the execution provides the first functionality only if the set of one or more predetermined properties is satisfied by data stored at the one or more memory locations when the first function is executed, and wherein the execution provides a second predetermined functionality that is different from the first functionality and predetermined in the protected item of software, if the set of one or more predetermined properties is not satisfied by data being stored at the one or more memory locations when the first function is executed.

* * * * *